United States Patent [19]

Palicot et al.

[11] Patent Number: 4,696,015
[45] Date of Patent: Sep. 22, 1987

[54] ECHO CORRECTION ESPECIALLY FOR TELEVISION BROADCAST SYSTEMS

[75] Inventors: Jacques P. Palicot; Guy P. Dublet, both of Rennes, France

[73] Assignee: Etablissement Public de Diffusion dit Telediffusion de France, France

[21] Appl. No.: 662,961

[22] Filed: Oct. 19, 1984

[30] Foreign Application Priority Data

Oct. 28, 1983 [FR] France .................................. 83 17438

[51] Int. Cl.$^4$ ......................... H03H 7/30; H03D 1/06
[52] U.S. Cl. ...................................... 375/14; 375/101; 375/103; 364/724; 379/411; 333/18
[58] Field of Search .......................... 375/14, 101, 103; 358/905; 333/18, 166; 364/724; 179/170.2; 379/406, 411

[56] References Cited

U.S. PATENT DOCUMENTS

| 3,868,603 | 2/1975 | Guidoux | 333/18 |
| 4,196,405 | 4/1980 | Le Dily | 375/14 |
| 4,225,832 | 9/1980 | Faye | 375/14 |

Primary Examiner—Robert L. Griffin
Assistant Examiner—M. Huseman
Attorney, Agent, or Firm—Laff, Whitesel, Conte & Saret

[57] ABSTRACT

Echo cancellation is carried out on a received demodulated analog signal. The apparatus comprises an analog transversal filter, a computing circuit for generating the direct coefficients a1 to ar and, eventually, feedback coefficients b2 to bm of an analog transversal filter. The input of a computing circuit is connected to the input of an analog transversal filter. The computing circuit is comprised of an analog-to-digital converter, whose output is connected to a self-adaptive digital transversal filter. The values of the digital transversal filter multiplication coefficients are applied, as coefficients, to the multipliers of the analog transversal filter. The optimization criterion is that of the mean quadratic error. The convergence algorithm is that of the gradient. The iterative correction may be carried out at each step on the digital transversal filter's group of coefficients. Or, it can be carried out cyclically of each of the digital transversal filter's coefficients. Variations of the self-adaptive digital transversal filter are described.

9 Claims, 4 Drawing Figures 4,696,015

ECHO CORRECTION ESPECIALLY FOR TELEVISION BROADCAST SYSTEMS

The present invention concerns a digital transmission echo canceller apparatus, that is, the cancellation of intersymbol interference, the cancellation being carried out on the received demodulated analog signals. In particular, the invention concerns an apparatus for the cancellation of echoes occurring in a data broadcasting system, such as the one described in French Patent document No. 2,313,825 and operated under the trademark "Reseau DIDON" by the French public broadcasting establishment "Telediffusion de France".

BACKGROUND

In the DIDON network, the binary data are transmitted in packets using NRZ coded amplitude modulation on picture lines of broadcasted television at the bit rate of 6.2 Mbit/s. The broadcast channel introduces a number of perturbations to the video signal, such as selective fades, noise and echoes resulting from reflections occurring near the location of the receiver. The impulse response is thus distorted. Considering the high bit rate used, a piggyback phenomenon occurs among impulses, that is, an intersymbol interference phenomenon. As the echo phenomena increase the sensitivity of the signal to noise and other parasitics, it is important to provide an echo canceller in the receivers of the DIDON data network.

In the text "TELEINFORMATIQUE Transport et Traitement de L'information dans les Resaux et Systemes Teleinformatiques", by C. Machi and J. F. Guibert (Ed. DUNOD 1979), the intersymbol interference phenomenon is discussed in section 3.1.4. To reduce these interferences, a linear receiver with digital filter, later adaptive, as indicated in section 3.3.3.F is provided. A linear digital filter is described in section A.2.2. of that same text.

SUMMARY

One object of the invention consists in providing an echo canceller apparatus comprising a linear analog filter whose coefficients can be determined by applying digital computing techniques.

In accordance with a characteristic of the invention, an echo cancellation device comprises an analog transversal filter and a computing circuit for generating the coefficients a1 to ar and eventually b1 to bm of the analog transversal filter. The input of the computing circuit is connected to the input of the analog transversal filter. The computing circuit comprises an analog-to-digital converter whose output is connected to a self-adaptive digital transversal filter, with at least some of the digital transversal filter multiplier circuits being applied to the multipliers of the analog transversal filter.

In accordance with another characteristic, the analog transversal filter is of the same type as the digital transversal filter.

In accordance with another characteristic, the optimization criteria in the computing circuit is that of the quadratic mean error. The convergence algorithm is the gradient. The iterative correction is carried out at each step on the set of filter coefficients.

In accordance with another characteristic, the optimization criteria is that of the quadratic mean error and the convergence algorithm is the gradient, the iterative correction being carried out cyclically, on each of the coefficients.

BRIEF DESCRIPTION OF THE DRAWINGS

The above-mentioned characteristics of the invention, as well as others, will become clearer upon reading the following description of the embodiment, the description being made in conjunction with the attached drawings, among which.

DETAILED DESCRIPTION OF THE EMBODIMENTS

Figure 1:
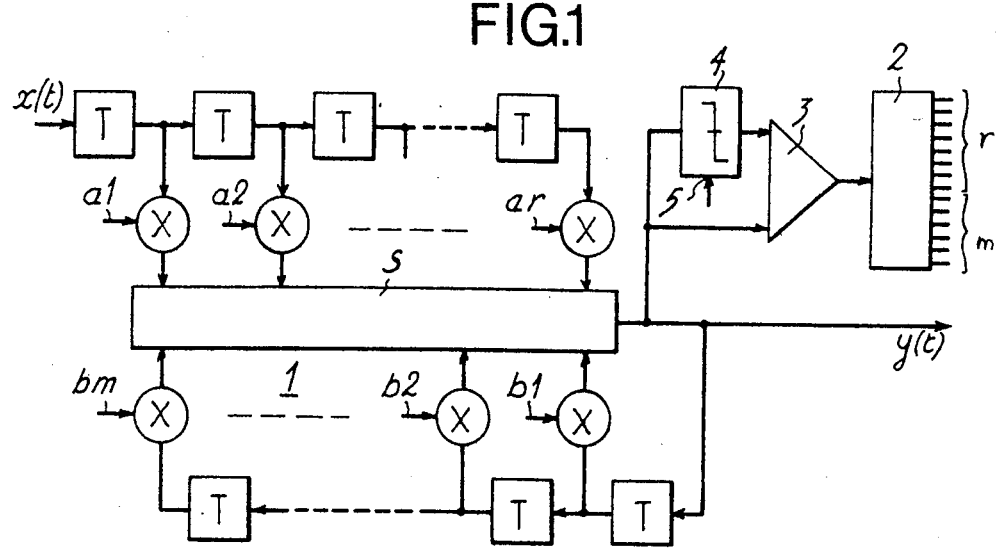
FIG. 1 is the schematic of a cancellation device using a part of the approach.

FIG. 1 illustrates the schematic of a known type of linear self-adaptive canceller which is comprised of, on one hand, a recursive transversal filter and, on the other and, a computing circuit 2, 3 and 4. Filter 1 is similar to the filter shown in FIG. A.2 on page 489 of the above-mentioned text. In filter 1, the signal x(t) to be corrected is applied to the input of a first cascade of $\underline{r}$ cells connected in series, with each cell introducing a delay T, where T is the inverse of the bit rate.

The outputs of the $\underline{r}$ cells are connected to the first inputs of $\underline{r}$ multipliers whose coefficients of multiplication are respectively a1 to ar. The outputs of the r multipliers are connected to corresponding inputs of a summer S. The output of summer S, which provides the corrected signal y(t), is also connected to a cascade of $\underline{m}$ cells connected in series, with each cell introducing a delay T. The outputs of the $\underline{m}$ cells are connected to the inputs of $\underline{m}$ multipliers whose coefficients of multiplication are respectively b1 to bm. The outputs of the $\underline{m}$ multipliers are connected to corresponding inputs of summer S.

The computing circuit 2 provides the coefficients a1 to ar and b1 to bm which are applied, in filter 1, to the corresponding inputs of the multipliers. The input of computing circuit 2 is connected to the output of a comparator 3, one input of which is directly connected to the output of filter 1 and the other input of which is connected to the output of a threshold detector 4, whose signal input is also connected to the output of filter 1. The threshold detector 4 has a threshold level control input 5 to which is applied a voltage defining the threshold level.

There are variations of the canceller of FIG. 1. In a first variation, filter 1 is direct and non-recursive, which amounts to removal of coefficients b1 to bm. In a second variation, the threshold detector 4 is added in the recursive part. If a reference signal is directly applied to the second input of comparator 3, the filter is thus only adaptive, instead of being auto-adaptive.

The reference voltage applied to the control input 5 of threshold detector 4 is generally equal to the average value of the output signal of filter 1. The output signal of threshold detector 4 thus corresponds to an estimated value y(t) of the output signal $\hat{y}(t)$. Comparator 3 thus generates the error signal $e(t) = y(t) - \hat{y}(t)$. In the computing circuit 2, we use as the canceller optimization criteria, the average quadratic error:

$$(H) = E(|a_k - y_k|^2)$$

where $a_k$ is the transmitted signal, being itself replaced by an estimated value in the case of an auto-adaptive filter. In a self-adaptive filter, we seek the vector components of $\vec{H}$ that minimize this expression.

Figure 2:
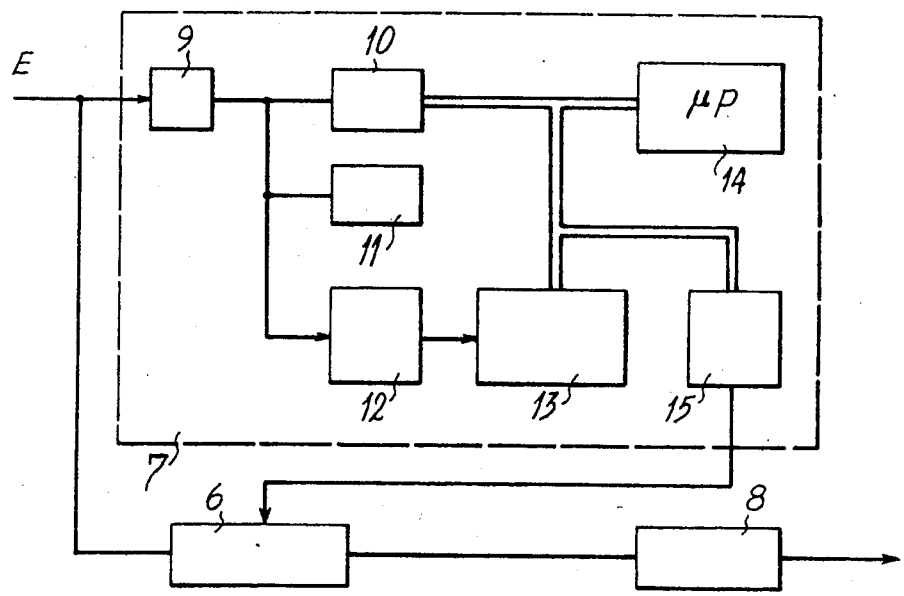
FIG. 2 is a block diagram of the cancellation device in accordance with the invention.

In the cancellation circuit of FIG. 2, the data carryng video signal is applied to input E which is connected in parallel, on one hand, to a transversal filter 6 and, on the other hand, to a computing circuit 7. Filter 6 operates directly on the analog signal applied to the input and generates the corrected analog signal which is applied to the input of a DIDON demodulator 8 which is, preferably, a receiver of the type described in French Patent document No. 2,313,825.

The computing circuit 7 comprised of a clamping circuit 9 whose output is connected, in parallel, to an average value computing circuit 10, a synchronization circuit 11 and an analog-to-digital converter 12, whose output is connected to a memory 13. Since input E is an analog video signal, circuit 9 must also have an analog output. The mean value circuit 10 has an output connected to a data bus leading to microprocessor 14 and to memory 13, which is fed from an analog-to-digital circuit. Therefore, it is apparent that circuit 10 must also include an analog-to-digital converter. The computing circuit 7 is also comprised of a microprocessor 14 The software of microprocessor 14 is such that computing circuit 7 operates, for example, as a feedback self-adaptive transversal filter, with decisions being made in the feedback loop.

In the analog-to-digital converter 12, the sampling frequency is equal to the bit rate, the sampling instant being centered in each basic time interval.

Figure 3:
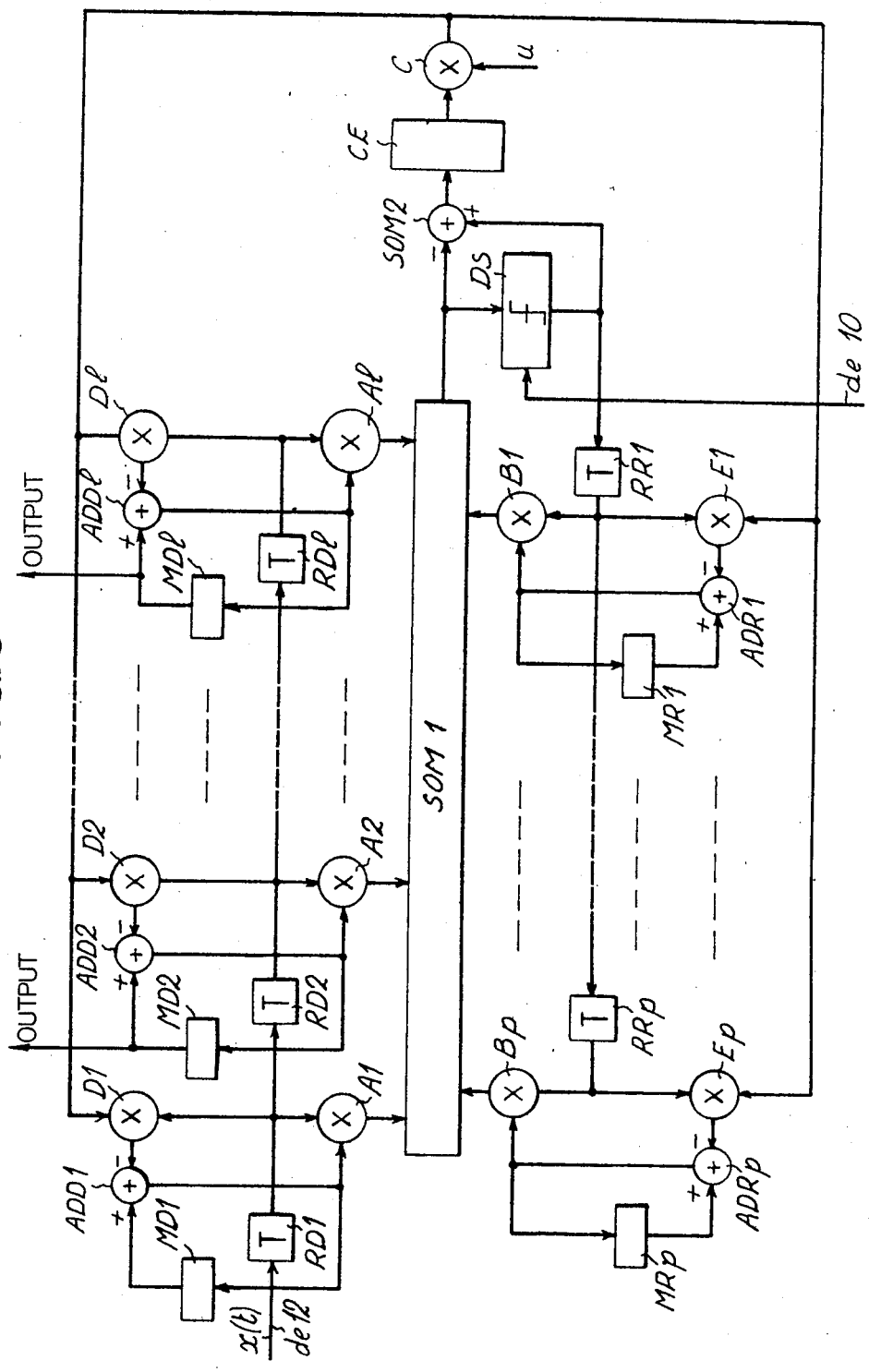
FIG. 3 is a schematic block diagram of a computing circuit made up of discrete circuits operating as the computing circuit of FIG. 2.

The schematic of FIG. 3 represents the filter made up by the computing circuit 7. The samples X(t), provided by the analog-to-digital converter 12, are applied to the input of a cascaded chain of 1 registers RD1 to RDl. The outputs of registers RD1 to RDl are respectively connected to the first inputs of 1 digital multipliers A1 to Al whose outputs are connected to the first 1 inputs of a digital summer SOM1. Registers RD1 to RDl can operate as delay registers with a clock of period T.

The output of summer SOM1 is connected, on one hand, to the input of a threshold detector DS and, on the other hand, to the input of a summer SOM2 whose + input is connected to the output of threshold detector D2.

The output of threshold detector DS is connected to the input of a chain of p delay registers RR1 to RRp. The outputs of registers RR1 to RRp are respectively connected to the first inputs of p inputs of summer SOM1. Registers RR1 to RRp can make up a delay register with a clock of period T. The threshold level control input of detector DS is connected to the output of the mean value calculating circuit 10.

The elements of the schematic shown in FIG. 3 which have just been described constitute one part of a decision feedback transversal filter with decision in the loop. The other part of the filter must comprise a circuit to compute the multiplier coefficients A1 to Al and Bp to B1. We will now describe this computing circuit.

The output of summer SOM2 is connected to an estimation circuit CE whose output is connected to a multiplier C to whose second input is applied the value of a coefficient u.

The output of multiplier C is connected to the first inputs of a first series of multipliers D1 to Dl and of a second series of multipliers E1 to Ep. The second inputs of multipliers D1 to Dl are respectively connected to the outputs of registers RD1 to RDl. The second inputs of multipliers E1 to Ep are respectively connected to the outputs of registers RR1 to RRp.

The outputs of multipliers D1 to Dl are respectively connected to the − inputs of summers ADD1 to ADDl whose outputs are respectively connected, on one hand, to the second inputs of multipliers A1 to Al and, on the otherhand, to the inputs of memories MD1 to MDl. The outputs of memories MD1 to MDl are respectivly connected to the + inputs of summer ADD1 to ADDl.

The outputs of multipliers E1 to Ep are respectively connected to the − inputs of summers ADR1 to DRp whose outputs are respectively connected, on one hand, to the second inputs of multipliers B1 to Bp and, on the other hand, to the inputs of memories MR1 to MRp. The outputs of memories MR1 to MRp are respectively connected to the + inputs of summers ADR1 to ADRp.

The memories MD1 to MDl have at their outputs, at sampling instant k, the values $H1^k$ to $Hl^k$ which are written at the sampling instant $(k-1)$. In the same conditions, memories MR1 to MRp produce the values $J1^k$ to $Jp^K$.

In practice, the output signal of summer SOM2 corresponds to the difference e between the estimated signal $a_k$ generated by the threshold detector DS and the output signal $y_k$ from summer SOM1. The k indices identify the rank of the digital sample considered.

Signal e is thus an error signal which is processed in the estimation circuit CE.

As we have mentioned above, we use, as the canceller optimization criteria, the mean quadratic error. If F(H) represents the mean quadratic error, we have:

$$F(H) = E(|a_k - y_k|^2) = E(|e|^2)$$

where the vector H is the vector that corresponds to the coefficients H1 to Hl.

The algorithm selected to minimize the criterion F(H) is, in one embodiment, the gradient algorithm which is defined below.

We wish that the difference $(F(H_k) - F(H_{k+1}))$ be minimized. Let us set $$\vec{H}_{k+1} = \vec{H}_k + \vec{h} \text{ with } \vec{h} << \vec{H}_k.$$

a first order expansion of $F(H_{k+1})$ gives $$F(\vec{H}_k) - F(\vec{H}_{k+1}) = -\vec{h}^T \cdot \Delta F(H_k).$$

In the case of a minimization, the first term of the above equality is positive. The second term, being the scalar product of two vectors. It is necessary that the direction of $\vec{h}^T$ be opposed to that of $\Delta \cdot F(\vec{H}_k)$ and be parallel to it, such as to maximize the scalar product, which implies:

$$\vec{h} = u \cdot \Delta F(\vec{H}_k) \text{ with } u < o.$$

Thus: $\vec{H}_{k+1} = \vec{H}_k - u \cdot \Delta F(\vec{H}_k)$

On the other hand:

$$\Delta F(H_k) = \Delta(a_k - y_k)^2$$

with:

$$y_k = \vec{H}_k{}^T \vec{X}_k{}^T$$

where the vector $\vec{X}_k$ represents the samples present in the filter, that is the samples available on the second inputs of multipliers D1 to Dl.

$$F(H_k) = 2 X_k(H_k{}^T X_k{}^T - a_k)$$
$$= 2 X_k(a_k - y_k)$$
$$= 2 X_k e_k$$

where $e_k$ is the signal available at the output of summer SOM2.

The convergence step size u of the algorithm is a constant which is selected close to the value of u defined above.

In practice, we can disregard the value of $e_k$, and simply keep its sign $sg(e_k)$, the value of u being adjusted accordingly.

In the embodiment of FIG. 3, the circuit CE is provided to generate the signal $sg(e_k)$. We thus have, on the first inputs of multipliers D1 to Dl, the signal $u \cdot sg(e_k)$. The second inputs of summers ADD1 to ADDl make up the components of vector $\vec{H}_k$. Thus, we have at the outputs of the same summers the components of vector $\vec{H}_{k+1}$.

In the preceding description, we have only considered the vector $\vec{H}_k$ made up of the coefficients H1 to Hl. We have applied the same incrementation signal $u \cdot sg(e_k)$ to the multipliers E1 to Ep as to the multipliers D1 to Dl. However it should be understood, that to obtain the coefficients J1 to Jp we could choose a convergence step size u' different from u.

In practice, the different operations— additions, multiplications, delays—which are carried out by the corresponding elements—summers, multipliers, registers—shown in FIG. 3 can also be carried out with the appropriate software in microprocessor 14 of FIG. 2. In fact, all the samples $X_k$, $y_k$, $H1_k$ to $Hl_k$, $J1_K$ to $Jp_k$ are available in memory 13 which also has the value of u and eventually u'. Finally, for the operation of the threshold detector circuit 9 periodically provides this value which is also recorded in memory 13.

The computing circuit 7 of FIG. 2 also is comprised of a buffer register 15 in which are memorized the coefficients of vector $\vec{H}_k$, that is the output coefficients of memories MD1 to MDl. The outputs of the buffer register are respectively connected to control inputs of a linear analog filter 6, these control inputs generating the multiplier coefficients of filter 6.

The filter 6 can be made up by a series of delay cells, each delay cell introducing a delay T. An analog multiplier circuit is inserted at the junction point between two lengths of cable, one input being connected to the end of the upstream cable and the output to the input of the downstream cable. The other input of the multiplier is connected to the output of a digital-to-analog converter whose digital input is connected to the corresponding output of buffer register 15.

In practice, the contents of buffer register 15 is updated only periodically, for example every ten seconds. After each update of register 15, the coefficients previously calculated are stored in memory 13. However, the samples stored in that memory are replaced by the newly entered samples.

Figure 4:
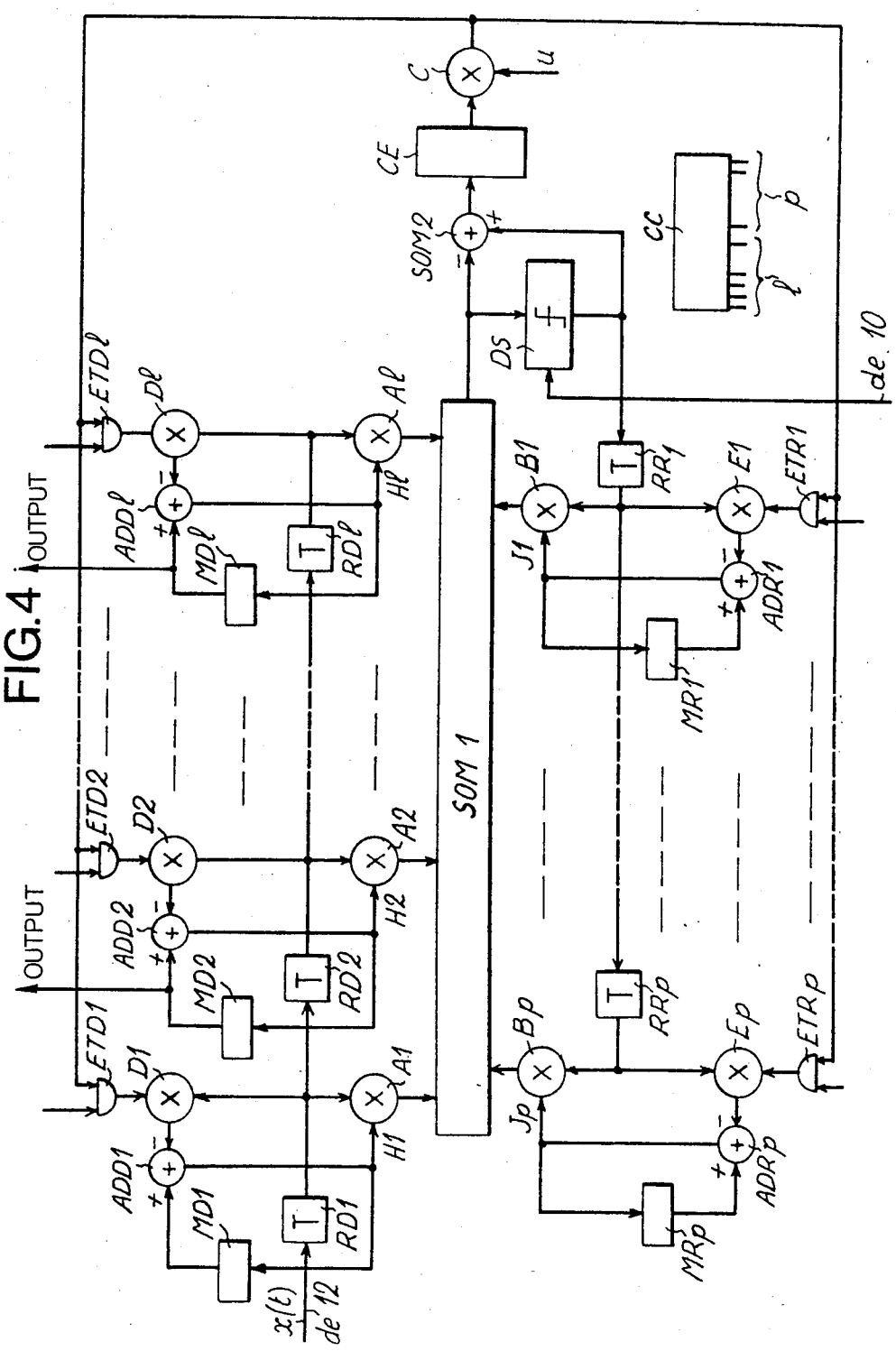
FIG. 4 is a block diagram of a variation of the computing circuit of FIG. 3.

In the block diagram of FIG. 4, we have all the elements seen in FIG. 3. In addition, it is comprised of an $1+p$ stage cyclic counter CC whose $1+p$ outputs are respectively connected to the first inputs of AND gates ETD1 to ETDl and ETR1 to ETRp whose second inputs are connected to the output of multiplier C and whose outputs are connected to the first inputs of multipliers D1 to Dl and E1 to Ep.

In the circuit of FIG. 4, we use the algorithm:

$$Fi_{k+1} = Fi_k - u \cdot Wi_k sg(e_k)$$

where Fi represents one of the coefficients H1 to Hl and J1 to Jp, the value of i being incremented by one at each computing step k between 1 and N, where $N = 1 + p$.

At the initial operating instant of the filter of the invention, one of the coefficient H1 to Hl takes on the value 1 while the other coefficients are nul, as are the coefficients J1 to Jp. The rank of the coefficient initially set to 1 defines what is referred to as the central coefficient. The selection of the central coefficient defines the maximum time spread of echos that the filter can cancel.

Experience has shown that, in the case of DIDON data broadcasting, good results were obtained by a non-recursive digital transversal filter comprised of ten delay cells, in which the fourth cell defines the central coefficient.

We claim:

1. A digital transmission echo analog cancellation apparatus for cancelling echoes in received video analog signals, the cancellation apparatus comprising analog transversal filter means and computing circuit means for generating direct coefficients a1-ar and recursive coefficients b1-bm of the analog transversal filter, a signal input of said computing circuit means being coupled to a signal input of the analog transversal filter means, the computing circuit means comprising an analog-to-digital converter having an output which is coupled to a self-adaptive digital transversal filter that includes a mean calculating circuit, sample memory means coupled to said analog-to-digital converter means for storing output samples from the analog-to-digital converter, microprocessor means and buffer memory means interconnected by data bus means, the microprocessor being coupled to operate and control the computing circuit means as a self-adaptive digital transversal filter with decisions made inside a loop, the buffer memory means storing those of the said direct and recursive coefficients which are selected by the microprocessor, and outputs of said buffer memory means connected to coefficient inputs of the analog transversal filter.

2. The cancellation apparatus in accordance with claim 1 wherein the computing circuit means includes an optimization criterion which provides a quadratic mean error and a convergence algorithm which have a gradient, an iterative correction being carried out at each step, the iterative correction being made on the set of coefficients of the digital transversal filter.

3. The cancellation apparatus in accordance with claim 1, wherein the computing circuit includes an optimization criterion which is that of a quadratic mean error and a convergence algorithm which have a gradient, an iterative correction being cyclically carried out on each of the coefficients of the digital transversal filter.

4. A digital transmission echo cancellation apparatus, the cancellation being carried out on demodulated received analog signals, the cancellation apparatus being comprised of an analog transversal filter and a computing circuit for generating direct coefficients a1 to ar, and recursives b1 to bm of the analog transversal filter, an input of said computing circuit being connected to an input of the analog transversal filter and the computing circuit being comprised of an analog-to-digital converter having an output which is connected to a self-adaptive digital transversal filter, the multiplier coefficient values of the digital transversal filter being applied, as coefficients, to the multipliers of the analog transversal filter, in the computing circuit including an optimization criterion which is that of a quadratic mean error and a convergence algorithm which has a gradient, an iterative correction being carried out at each step, the iterative correction being made on the set of coefficients of the digital transversal filter, the self-adaptive digital transversal filter being made up of an averaging circuit, a memory for samples supplied by the analog-to-digital converter, and a microprocessor that multiplies samples in memory by coefficients which it computes, and said microprocessor sums the multiplied samples in accordance with an optimization criterion and a convergence algorithm.

5. The cancellation apparatus in accordance with claim 4, wherein the analog transversal filter and the digital transversal filter are comprised of the same type of circuits.

6. A digital transmission echo cancellation apparatus, the cancellation being carried out on demodulated received analog signals, the cancellation apparatus being comprised of an analog transversal filter and a computing circuit for generating direct coefficients a1 to ar, and recursive coefficients b1 to bm of the analog transversal filter, an input of the computing circuit being connected to an input of the analog transversal filter and the computing circuit being comprised of an analog-to-digital converter having an output which is connected to a self-adaptive digital transversal filter, the multiplier coefficient values of the digital transversal filter being applied, as coefficients, to the multipliers of the analog transversal filter, the computing circuit including an optimization criterion which is that of a quadratic mean error and a convergence algorithm which has a gradient, an iterative correction being carried out at each step, the iterative correction being made on the set of coefficients of the digital transversal filter, the computing circuit being a transversal filter with first discrete multipliers (A1 to Al and B1 to Bp), each of said discrete multipliers having a first input which is respectively connected to the output of a delay cell (RD1 to RDl and PR1 to RRp), and having an output which is connected to a corresponding input of a first summer (SOM1), a second input of each first multiplier being connected to an output of a second summer (ADD1 to ADDl and ADR1 to ADRp), the output of said second summer (ADD1 to ADDl and ADR1 to ADRp) also being connected to a memory (MD1 to MDl and MR1 to MRp), a positive (+) input of said second summer (ADD1 to ADDl and ADR1 to ADRp) being connected to an output of said memory (MD1 to MDl and MR1 to MRp) and a negative (−) input of said second summer (ADD1 to ADDl and ADR1 to ADRp) being connected to an output of a second multiplier (D1 to Dl and E1 to Ep), an input of said second multiplier (D1 to Dl and E1 to Ep) being connected to an output of said delay cell (RD1 to RDl and RR1 to RRp), an output of the first summer (SOM1) being connected to a computing set (DS, SOM2, CE, C), an output of said computing set being connected in parallel to second inputs of the second multipliers (D1 to Dl and E1 to Ep).

7. The cancellation apparatus in accordance with claim 6, wherein the analog transversal filter and the digital transversal filter are comprised of the same type of circuits.

8. A digital transmission echo cancellation apparatus, the cancellation being carried out on demodulated received analog signals, the cancellation apparatus being comprised of an analog transversal filter and a computing circuit for generating direct coefficients a1 to ar, and recursives b1 to bm of the analog transversal filter, an input of said computing circuit being connected to an input of the analog transversal filter and the computing circuit being comprised of an analog-to-digital converter having an output which is connected to a self-adaptive digital transversal filter, the multiplier coefficient values of the digital transversal filter being applied, as coefficients, to the multipliers of the analog transversal filter, the computing circuit including an optimization criterion which is that of a quadratic mean error and a convergence algorithm which have a gradient, an iterative correction being cyclically carried out on each of the coefficients of the digital transversal filter, the computing circuit being a transversal filter with first discrete multipliers (A1 to Al and B1 to Bp), each of said multipliers having a first input which is respectively connected to the output of a delay cell (RD1 to RDl and RR1 to RRp), and each of said multipliers having an output which is connected to a corresponding input of a summer (SOM1), each second input of each first multiplier being connected to an output of a summer (ADD1 to ADDl and ADR1 to ADRp), the output of summer ADD1 to ADDl and ADR2 to ADRp) being connected to a memory (MD1 to MDl and MR1 to MRp), a (−) input of said summer (ADD1 to ADDl and ADR1 to ADRp) being connected to an output of a second multiplier (D1 to Dl and E1 to Ep), an input of said second multiplier being connected to an output of delay cell (RD1 to RDl and RR1 to RRp), an output of the summer (SOM2) being connected to a computing set (DS, SOM2, CE, C), an output of said computing set being connected in parallel to first inputs of AND gates (ETD1 to ETDl and ETR1 to ETRp), outputs of said AND gates being respectively connected to second inputs of the second multipliers (D1 to Dl and E1 to Ep) and second inputs of said AND gates (ETD1 to ETDl and ETR1 to ETRp) being respectively connected to outputs of a cyclic counter (CC).

9. The cancellation apparatus in accordance with claim 8, wherein the analog transversal filter and the digital transversal filter are comprised of the same type of circuits.

* * * * *